Patented Jan. 29, 1952

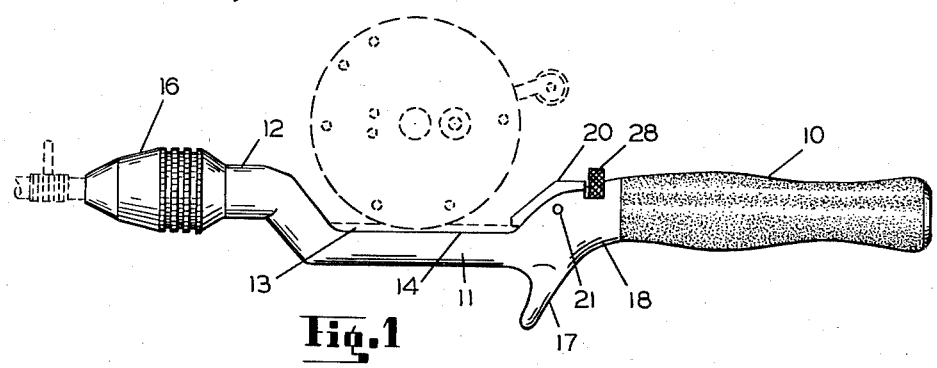
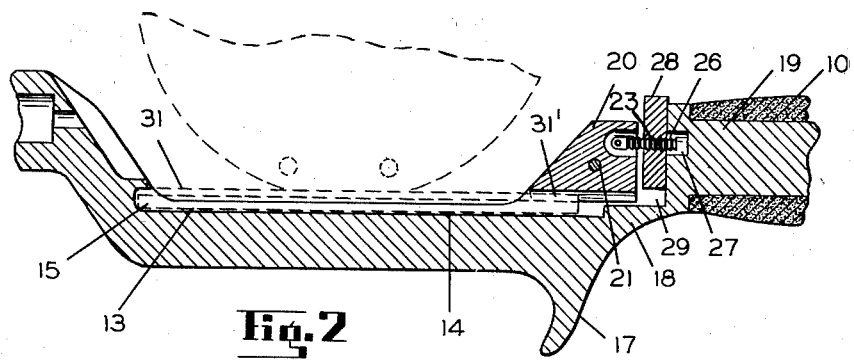
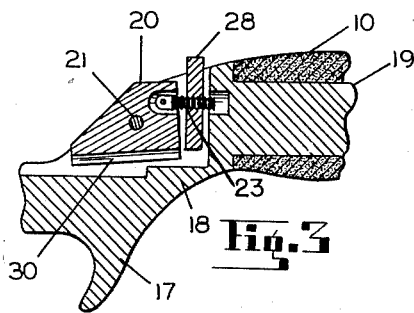
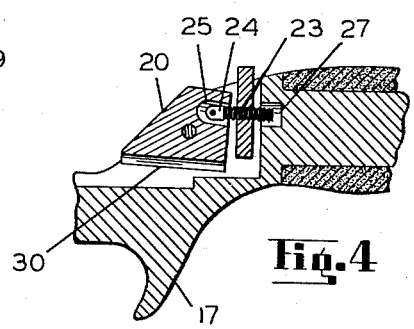
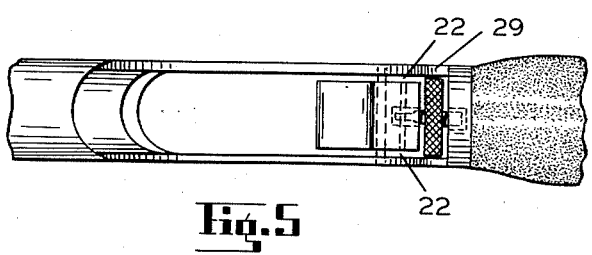
INVENTOR.
WILLIAM C. WARTH

2,583,909

UNITED STATES PATENT OFFICE 2,583,909

FISHING ROD HANDLE

William C. Warth, Milwaukee, Wis.

Application September 30, 1949, Serial No. 118,950

4 Claims. (Cl. 43—22)

This invention relates to a fishing rod handle and is particularly directed to providing an improved means for detachably mounting a conventional type reel thereon.

A fishing rod handle comprises in general a hand grip portion at one end, a rod receiving portion at the opposite end, and a reel seat portion intermediate of the two ends. Releasable means are provided in the reel seat receiving portion to lock the base of the reel firmly in its seat.

A primary object of my invention is the provision of a novel means for attaching the reel to the handle, in a manner whereby the same may be easily and quickly attached and securely locked in position for use.

Another object of my invention is the provision of an improved means for detachably mounting a reel to the handle which is simple in structure, economical to manufacture and highly efficient in use.

An understanding of the manner in which the above and other objects of the invention are attained may be had from the following description, reference being made to the accompanying drawing in which:

Figure 1 is a side elevational view of the invention in locking position.

Figure 2 is a longitudinal, cross-sectional view of the invention in locking position.

Figure 3 is an enlarged detailed view of the invention in positive engagement position.

Figure 4 is an enlarged detail view of the invention in position when in non-locking position.

Figure 5 is a fragmentary top plan view of my invention.

Like reference characters refer to like parts throughout the specification and drawings.

The invention comprises a hand grip portion 10 covered with cork or any other suitable material, a reel receiving portion 11, and a rod receiving portion 12. The reel base portion 13 shown in phantom is preferably depressed and provides an elongated plane surface 14 on which the reel rests. The forward end wall of the reel base portion is undercut, as indicated by the numeral 15, to form a recess adapted to receive the forward end of the reel base 13 in sliding fit engagement.

The rod receiving portion 12 is provided with a coupling member 16 and is adapted to temporarily mount the butt end of a fishing rod.

A finger grip 17 projects downwardly from the metallic shoulder 18 which is integral with an extension 19 upon which the grip 10 is mounted.

A wedge lock member 20 is pivotally mounted on a pin 21 supported by spaced ears 22 integral with the shoulder member 18.

A threaded adjustment member 23 has one end 24 extending into and hingedly supported within a recess 25 provided within the wedge lock member 20.

The other end of the member 23 is disposed within a recess 27 provided within the metallic shoulder 18. This threaded end 26 is free to move horizontally within the recess 27. Threadedly mounted onto the adjustment member 23 is a knurled wheel 28 which is disposed within the slot 29 so that upon rotation of wheel 28 the end 26 of member 23 moves within the recess 27.

When it is intended to place the reel in position the wheel 28 is rotated around the member 23 so that the end 26 is moved further into the recess 27 as shown in Figure 4. The result of this operation is that the wedge lock member 20 has its base 30 raised away from the plane surface 14. Raising of the wedge 20 provides clearance so that after the foot portion 31 of the base 13 for the reel is placed in the recess 15, the foot portion 31' on the opposite end of the base 13 for the reel can readily be inserted under the base 30 of the wedge lock 20. The wheel 28 is then rotated whereby the end 26 of the member 23 moves a short distance toward the open end of recess 27, thereupon tilting the wedge lock 20 downwardly so that the base 30 bears strongly down against the foot portion 31' and thereby securing the reel base in the plane surface 14 as shown in Figure 2.

There may be variations in the thickness of the reel base of the various types. To compensate for these different sizes I contemplate arranging my wedge lock to move through a substantial distance. Reference to Figure 3 will indicate to some extent the distance through which the base portion 30 may be made to bear against the reel base.

The improved clamp of my invention thus permits rapid assembling of the reel with the fishing rod handle and a secure lock when so assembled.

Although I have shown and described a preferred embodiment of my invention, I am aware that departures may be made therefrom without departing from the spirit of the invention and the scope of the appended claims.

Having thus described my invention, what I claim and desire to secure by Letters Patent in the United States is:

1. The combination with a fishing rod handle comprising, a reel support having a rod receiving socket at its forward end and a hand grip at its rearward end, a reel seat disposed intermediate said ends, a recessed metallic shoulder adjacent said hand grip end and integral with said reel seat, said reel seat having a recess at the forward end and a wedge clamp element pivotally mounted at the rear end, a screw element having one end hingedly mounted in said wedge lock and having its other end freely movable in said recessed metallic shoulder, a rotating member threadedly mounted on said screw for moving said screw in a substantially longitudinal direction.

2. The combination with a fishing rod handle comprising, a reel support having a rod receiving socket at its forward end and a hand grip at its rearward end, a reel seat disposed intermediate said ends, a recessed metallic shoulder adjacent said hand grip end and integral with said reel seat, said reel seat having a recess at the forward end and a wedge clamp element pivotally mounted at the rear end, a screw element having one end hingedly mounted in said wedge lock and having its other end freely movable in said recessed metallic shoulder, a knurled washerlike member threadedly mounted onto said screw for moving said screw in a substantially longitudinal horizontal direction.

3. The combination with a fishing rod handle comprising a reel support having a rod receiving socket at its forward end and a hand grip at its rearward end, a reel seat disposed intermediate said ends, a recessed metallic shoulder adjacent said hand grip, and integral with said reel seat, said reel seat having a recess at the forward end and a recessed wedge clamp element pivotally mounted near its rear end, a screw element having one end hingedly mounted in said wedge lock and having its other end freely movable horizontally within said recessed metallic shoulder, a rotating member threadedly mounted on said screw for moving said screw in a substantially longitudinal direction whereby the wedge lock may assume various angular positions with respect to its pivoted action.

4. The combination with a fishing rod handle comprising a reel support having a rod receiving socket at its forward end and a hand grip at its rearward end, a reel seat disposed intermediate said ends, a recessed metallic shoulder adjacent said hand grip end and integral with said reel seat, said reel seat having a recess at the forward end and a recessed wedge clamp element pivotally mounted near its rear end, a screw element having one end hingedly mounted in said wedge lock and having its other end freely movable horizontally within said recessed metallic shoulder, a rotating member threadedly mounted on said screw for moving said screw in a substantially longitudinal direction whereby upon actuation of the rotating member, the base of the wedge lock may assume various angular positions with respect to said reel seat.

WILLIAM C. WARTH.

REFERENCES CITED

The following references are of record in the file of this patent:

UNITED STATES PATENTS

| Number | Name | Date |
| --- | --- | --- |
| 2,102,237 | Kinnear | Dec. 14, 1937 |
| 2,490,584 | Dunkelberger | Dec. 6, 1949 |
| 2,504,801 | Carlson | Apr. 18, 1950 |